E. V. JOHNSON.
COLUMN FOR BUILDINGS AND OTHER STRUCTURES.
APPLICATION FILED MAY 22, 1908.
926,747.
Patented July 6, 1909.
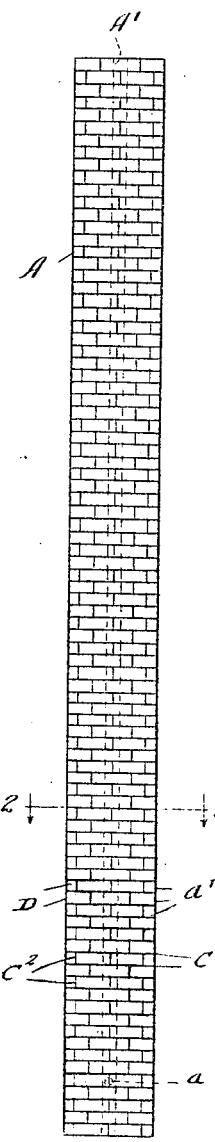
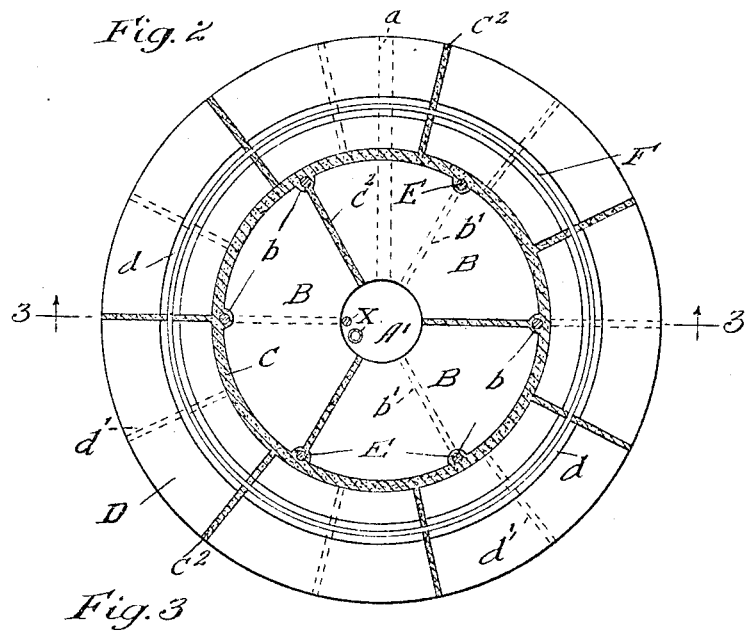
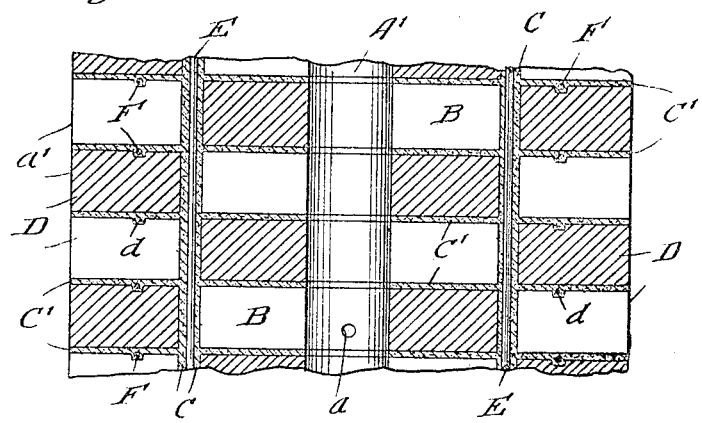
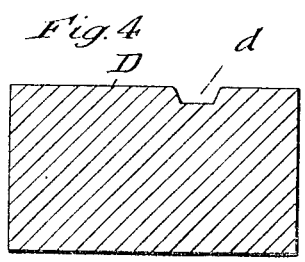
Witnesses:
Wm. Geiger
A. W. Munday.
Inventor
Ernest V. Johnson.
By Munday, Evarts, Adcock & Clarke.
Attorneys

UNITED STATES PATENT OFFICE.

ERNEST V. JOHNSON, OF CHICAGO, ILLINOIS.

COLUMN FOR BUILDINGS AND OTHER STRUCTURES.

No. 926,747.　　　　Specification of Letters Patent.　　　Patented July 6, 1909.

Application filed May 22, 1908. Serial No. 434,432.

*To all whom it may concern:*

Be it known that I, ERNEST V. JOHNSON, a citizen of the United States, residing in Chicago, in the county of Cook and State of Illinois, have invented a new and useful Improvement in Columns for Buildings and other Structures, of which the following is a specification.

My invention relates to improvements in supporting columns for buildings and other structures. Its object is to provide a supporting column of a simple and inexpensive construction which will be thoroughly fireproof and capable of successfully withstanding without injury or danger of collapse fierce fire and very high heat and without material diminution of its load carrying capacity and which will have very great strength and crushing resistance for a given radius of gyration, and which may be rapidly and cheaply erected.

My invention consists in the means I have discovered, and which I have demonstrated by my experiments may be employed, for successfully and practically accomplishing this object or result. That is to say, it consists in a supporting column composed of terra cotta blocks reinforced by vertical steel rods and horizontal steel bands, the terra cotta blocks of the outer layer in each horizontal course being furnished with grooves to receive the endless horizontal reinforcing bands, and the vertical reinforcing rods being disposed at intervals between the terra cotta blocks of the inner and outer layers, the upright faces of one set of terra cotta blocks, preferably the inner set, being furnished with vertical channels to receive the upright reinforcing rods, and the space between the inner and outer layers of terra cotta blocks being filled with cement grouting, preferably applied in a liquid form by pouring, so as to completely fill the upright space between the inner and outer layers of terra cotta blocks and to cause the upright reinforcing rods to be completely embedded and thoroughly anchored throughout their whole length and surface, through this cement grouting, to the terra cotta blocks composing the column; the reinforcing horizontal bands being also completely embedded and thoroughly anchored throughout their whole extent and surface in the cement mortar in which the horizontal courses of terra cotta blocks are laid.

The invention further consists in providing the inner set or layer of terra cotta blocks in the column with curved or truncated inner ends or faces to form a central opening or passage, preferably from three to four inches in diameter to receive conduits, piping and wiring for the building, the same being led out through horizontal passages or openings provided in or bored through the terra cotta blocks composing the column. By this horizontally and vertically reinforced terra cotta block construction of column, I produce a supporting column which is thoroughly fireproof, capable of withstanding very high heat and fierce fire without danger of collapse or material weakening its load supporting capacity, while at the same time it is capable of being very rapidly and quickly constructed, and at a comparatively low cost.

In the accompanying drawing forming a part of this specification, Figure 1 is a side elevation of a reinforced terra cotta block column embodying my invention. Fig. 2 is an enlarged horizontal section on line 2—2 of Fig. 1, the cement mortar between the horizontal courses not being shown in order to show a plan or face view of the inner and outer sets or layers of terra cotta blocks in one complete horizontal course. Fig. 3 is a vertical section on line 3—3 of Fig. 2, the cement mortar between the upright joints of contiguous terra cotta blocks being omitted in order to show the upright faces of the alternate terra cotta blocks. Fig. 4 is an enlarged vertical section of one of the terra cotta blocks of the outer set or layer.

My improved reinforced terra cotta block supporting column A is furnished with an upright hollow passage A¹ at the center for receiving and accommodating conduits, electric or other wires and pipes X, and also with horizontal passages or holes $a$ through which such conduits, wires or pipes may be led out.

My improved reinforced terra cotta column A is preferably of circular form in cross section, although it may be of any desired shape or outline. It is composed of an inner set or layer of terra cotta or burnt clay blocks B, an outer set or layer of burnt clay or terra cotta blocks D with an intermediate filling C of cement grouting, and cement mortar C¹ between the separate horizontal courses of the blocks B D, and cement mortar C² between the adjacent upright faces of the terra cotta blocks B D and upright steel reinforcing rods E, disposed at regular intervals between the inner terra cotta blocks B and the outer terra cotta blocks D, and endless steel reinforcing bands F between adjacent horizontal courses of the outer terra cotta blocks D. The inner terra cotta blocks B are furnished on their outer faces with upright channels or grooves $b$ to receive the upright steel reinforcing rods E, and the outer layer of terra cotta blocks D are furnished on their upper face with channels or grooves $d$ to receive the horizontal steel reinforcing bands F which are made endless by electrically welding the meeting ends of each band together. The upright reinforcing rods E may be of any desired shape in cross section, but I prefer to make them round. The endless horizontal reinforcing bands F may likewise be of any desired shape in cross section, but I prefer that the same should also be round or circular.

The terra cotta blocks B of successive horizontal courses $a^1$ are laid to break joints with each other as indicated by the dotted lines $b^1$ in Fig. 2, and the terra cotta blocks D of the outer layer are likewise laid breaking joints with each other, as indicated by the dotted lines $d^1$ in Fig. 2. And the upright cement mortar joints $C^1$ of the inner terra cotta blocks B are preferably arranged to break joints with the upright cement mortar joints $C^2$ of the outer layer of terra cotta blocks D in each horizontal course $a^1$ of the column.

While I prefer to construct my reinforced terra cotta supporting column of two layers of terra cotta blocks B, D, one or more intermediate layers of terra cotta blocks may be employed if desired, between the inner and outer layers, B, D.

I claim:—

1. A reinforced terra cotta block supporting column for buildings or other structures, comprising inner and outer layers of terra cotta blocks, laid in successive courses, one layer surrounding the other, with a space for grouting between, upright steel reinforcing rods between said layers and horizontal steel reinforcing bands between the successive courses of terra cotta blocks of the surrounding layer, cement grouting filling the space between the inner and outer layers and in which said upright reinforcing rods are embedded and anchored, and cement mortar between the horizontal and upright joints of adjacent terra cotta blocks in both layers, said horizontal steel reinforcing bands being embedded in the cement mortar between adjacent horizontal courses of terra cotta blocks of the surrounding layer of blocks, said column being of relatively small diameter in respect to its height and said upright reinforcing rods being all near together and within a relatively small area and coöperating with the other parts to give the column great strength for a given radius of gyration said column being substantially solid substantially as specified.

2. A reinforced terra cotta block supporting column for buildings or other structures, comprising inner and outer layers of terra cotta blocks laid in successive courses, one layer surrounding the other with a space for grouting between, upright steel reinforcing rods between said layers and horizontal steel reinforcing bands between the successive courses of terra cotta blocks of the surrounding layer, cement grouting filling the space between the inner and outer layers and in which said upright reinforcing rods are embedded and anchored, and cement mortar between the horizontal and upright joints of adjacent terra cotta blocks in both layers, said horizontal steel reinforcing bands being embedded in the cement mortar between adjacent horizontal courses of terra cotta blocks of the surrounding layer of blocks, the terra cotta blocks of one of said layers having upright channels or grooves to receive said upright reinforcing rods, said column being of relatively small diameter in respect to its height and said upright reinforcing rods being all near together and within a relatively small area and coöperating with the other parts to give the column great strength for a given radius of gyration, said column being substantially solid, substantially as specified.

3. A reinforced terra cotta block supporting column for buildings or other structures, comprising inner and outer layers of terra cotta blocks, laid in successive courses, one layer surrounding the other with a space for grouting between, upright steel reinforcing rods between said layers and horizontal steel reinforcing bands between the successive courses of terra cotta blocks of the surrounding layer, cement grouting filling the space between the inner and outer layers and in which said upright reinforcing rods are embedded and anchored and cement mortar between the horizontal and upright joints of adjacent terra cotta blocks in both layers, said horizontal steel reinforcing bands being embedded in the cement mortar between adjacent horizontal courses of terra cotta blocks of the surrounding layer of blocks, the terra cotta blocks of one of said layers having upright channels or grooves to receive said upright reinforcing rods, and the terra cotta blocks of the surrounding layer having channels or grooves to receive said horizontal reinforcing bands, said column being of relatively small diameter in respect to its height and said upright reinforcing rods being all near together and within a relatively small area and coöperating with the other parts to give the column great strength for a given radius of gyration said column being substantially solid, substantially as specified.

4. A reinforced terra cotta block supporting column for buildings or other structures, comprising inner and outer layers of terra cotta blocks, laid in successive courses, one layer surrounding the other with a space for grouting between, upright steel reinforcing rods between said layers and horizontal steel reinforcing bands between the successive courses of terra cotta blocks of the surrounding layer, cement grouting filling the space between the inner and outer layers and in which said upright reinforcing rods are embedded and anchored and cement mortar between the horizontal and upright joints of adjacent terra cotta blocks in both layers, said horizontal steel reinforcing bands being embedded in the cement mortar between adjacent horizontal courses of terra cotta blocks of the surrounding layer of blocks, the terra cotta blocks of the surrounding layer having channels to receive said horizontal reinforcing bands, said column being of relatively small diameter in respect to its height and said upright reinforcing rods being all near together and within a relatively small area and coöperating with the other parts to give the column great strength for a given radius of gyration said column being substantially solid substantially as specified.

5. A reinforced terra cotta block supporting column for buildings or other structures, comprising inner and outer layers of terra cotta blocks laid in successive courses, one layer surrounding the other, with a space for grouting between, upright steel reinforcing rods between said layers, and horizontal steel reinforcing bands between the successive courses of terra cotta blocks of the surrounding layer, cement grouting filling the space between the inner and outer layers and in which said upright reinforcing rods are embedded and anchored and cement mortar between the horizontal and upright joints of adjacent terra cotta blocks in both layers, said horizontal steel reinforcing bands being embedded in the cement mortar between adjacent horizontal courses of terra cotta blocks of the surrounding layer of blocks, said column being substantially solid and having an upright central opening or passage to receive and accommodate conduits, wiring or piping, substantially as specified.

6. A reinforced terra cotta block supporting column for buildings or other structures, comprising inner and outer layers of terra cotta blocks laid in successive courses, one layer surrounding the other, with a space for grouting between, upright steel reinforcing rods between said layers and horizontal steel reinforcing bands between the successive courses of terra cotta blocks of the surrounding layer, cement grouting filling the space between the inner and outer layers and in which said upright reinforcing rods are embedded and anchored and cement mortar between the horizontal and upright joints of adjacent terra cotta blocks in both layers, said horizontal steel reinforcing bands being embedded in the cement mortar between adjacent horizontal courses of terra cotta blocks, of the surrounding layer of blocks, the terra cotta blocks of one of said layers having upright channels or grooves to receive said upright reinforcing rods, and the terra cotta blocks of the surrounding layer having channels or grooves to receive said horizontal reinforcing bands, said column being substantially solid and having an upright central opening or passage to receive and accommodate conduits, wiring or piping, said column being of relatively small diameter in respect to its height and said upright reinforcing rods being all near together and within a relatively small area and coöperating with the other parts to give the column great strength for a given radius of gyration, substantially as specified.

7. A fireproof terra cotta block supporting column composed of terra cotta blocks furnished with upright reinforcing rods and a series of horizontal reinforcing bands, said upright rods and horizontal bands being embedded in the cement of the upright and horizontal joints respectively between contiguous terra cotta blocks of the column, said column being of relatively small diameter in respect to its height and said upright reinforcing rods being all near together and within a relatively small area and coöperating with the other parts to give the column great strength for a given radius of gyration, said column being substantially solid, substantially as specified.

ERNEST V. JOHNSON.

Witnesses:
H. M. MUNDAY,
PEARL ABRAMS.